(12) United States Patent
Wysinger

(10) Patent No.: US 10,591,072 B1
(45) Date of Patent: Mar. 17, 2020

(54) SEWER BACK-UP PREVENTION DEVICE FOR A RECREATIONAL VEHICLE

(71) Applicant: Marty L. Wysinger, Cloverdale, CA (US)

(72) Inventor: Marty L. Wysinger, Cloverdale, CA (US)

( * ) Notice: Subject to any disclaimer, the term of this patent is extended or adjusted under 35 U.S.C. 154(b) by 0 days.

(21) Appl. No.: 16/525,957

(22) Filed: Jul. 30, 2019

(51) Int. Cl.
  *F16K 15/03* (2006.01)
  *E03F 1/00* (2006.01)
(52) U.S. Cl.
  CPC .............. *F16K 15/03* (2013.01); *E03F 1/008* (2013.01)
(58) Field of Classification Search
  CPC ................................ F16K 15/03; E03F 1/008
  USPC ........................................................... 137/527
  See application file for complete search history.

(56) References Cited

U.S. PATENT DOCUMENTS

| | | | | |
|---|---|---|---|---|
| 1,635,842 | A | * | 7/1927 | Hirshstein ............... F16K 15/03 137/527.2 |
| 5,417,460 | A | | 5/1995 | Lunder |
| 5,588,459 | A | | 12/1996 | Ellis |
| 5,904,183 | A | | 5/1999 | Leech |
| 5,971,438 | A | | 10/1999 | Johnson |
| 6,746,178 | B1 | | 6/2004 | Hensley et al. |
| 7,013,922 | B2 | | 3/2006 | Thum |
| 7,036,524 | B2 | | 5/2006 | Kennedy |
| 8,465,059 | B1 | * | 6/2013 | Price ...................... E03F 1/008 285/278 |
| D760,364 | S | | 6/2016 | Angel |
| 9,649,996 | B1 | | 5/2017 | Mohlencamp |

* cited by examiner

*Primary Examiner* — P. Macade Nichols
(74) *Attorney, Agent, or Firm* — Cramer Patent & Design, PLLC; Aaron R. Cramer

(57) ABSTRACT

A sewer back-up prevention device for a recreational vehicle utilizes a T-shaped unit of tubing having a recreational vehicle sewer line hook-up on a first end, a sewer hose hook-up on a second end, and a trap cleanout access point disposed therebetween. Disposed within the T-shaped unit is a one-way flapper valve.

11 Claims, 5 Drawing Sheets

SEWER BACK-UP PREVENTION DEVICE FOR A RECREATIONAL VEHICLE

RELATED APPLICATIONS

Not applicable.

FIELD OF THE INVENTION

The present invention relates generally to a traffic emergency signaling device.

BACKGROUND OF THE INVENTION

Many recreational vehicles have earned a well-deserved spot of the list of favorite pastimes of countless people. The ability to go anywhere, virtually anytime, with all of the comforts of home make them truly enjoyable. Whether one travels in a motorized coach, a fifth wheel trailer, a pull behind trailer or even a simple pop-up trailer, they are ensured of seeing all that the land has to offer with a minimum impact on cost and a maximum impact on fun. Just about all of these recreational vehicles have the ability to hook up to a sewer system to drain away wastewater while parked in a recreational vehicle campground.

Unfortunately, many of these campground sanitary systems are of questionable quality and backups are common. When backups are coupled with hilly terrains, sewage flowing out of the lowest point and even up into other connected recreational vehicles are common. This is not only unsanitary and disgusting, but cleanup and repair of these units can be costly. Accordingly, there exists a need for a means by which the risk of sewage backflow into recreational vehicles can be eliminated. The development of the sewer backflow prevention device for recreational vehicles fulfills this need.

SUMMARY OF THE INVENTION

The inventor has recognized the aforementioned, inherent problems and lack in the art and observed that there is a need for a sewer backflow prevention device, comprising a bayonet fitting which is disposed on a first end of the sewer backflow prevention device, a lug fitting which is disposed on a second end of the sewer backflow prevention device, two sections of piping which are utilized to connect the bayonet fitting to the backflow prevention valve and the backflow prevention valve to the lug fitting and a backflow prevention valve which is provided on a center of the sewer backflow prevention device. The backflow prevention valve has an access cover.

Sewage may travel through the sewer backflow prevention device along a sewage travel path from the bayonet fitting to the lug fitting. The connections may be made by solvent adhesive. The sewage travel path may lift a flapper gate through a pivoting travel path via a hinge assembly to a lifted position under normal conditions. The flapper gate rests against a valve seat surface during times of no sewage flow. The valve seat surface may prevent the flapper gate from reverse travel. Any sewage flowing in an opposite direction may be stopped at the backflow prevention. The valve may prevent sewage from traveling through the sewer backflow prevention device in a reverse direction. The connections may be made by interconnection of male and female threads.

The piping may be made of plastic. The access cover may be used to gain access to an interior of the backflow prevention valve for cleaning, maintenance, or repair. The sewer backflow prevention device may allow for interconnection with a plurality of devices selected from the group consisting of a plurality of hoses, a plurality of couplings, a plurality of elbows, or a plurality of flush fittings that are standard on a recreational vehicle sewer connection. The sewer backflow prevention device may be sixteen inches in overall length and may be three inches in overall end height. The sewer backflow prevention device may be connected at a distal end of the flexible sewer hose. The opposite end of the sewer backflow prevention device may be connected to a drain elbow prior to connection to an in-ground sewer connection. The opposite end of the sewer backflow prevention device may be connected to a drain elbow prior to connection to an in-ground sewer connection at a dump station. The sewer backflow prevention device may be located in a horizontal position with the hinge assembly as well as the access cover located at a center-top position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
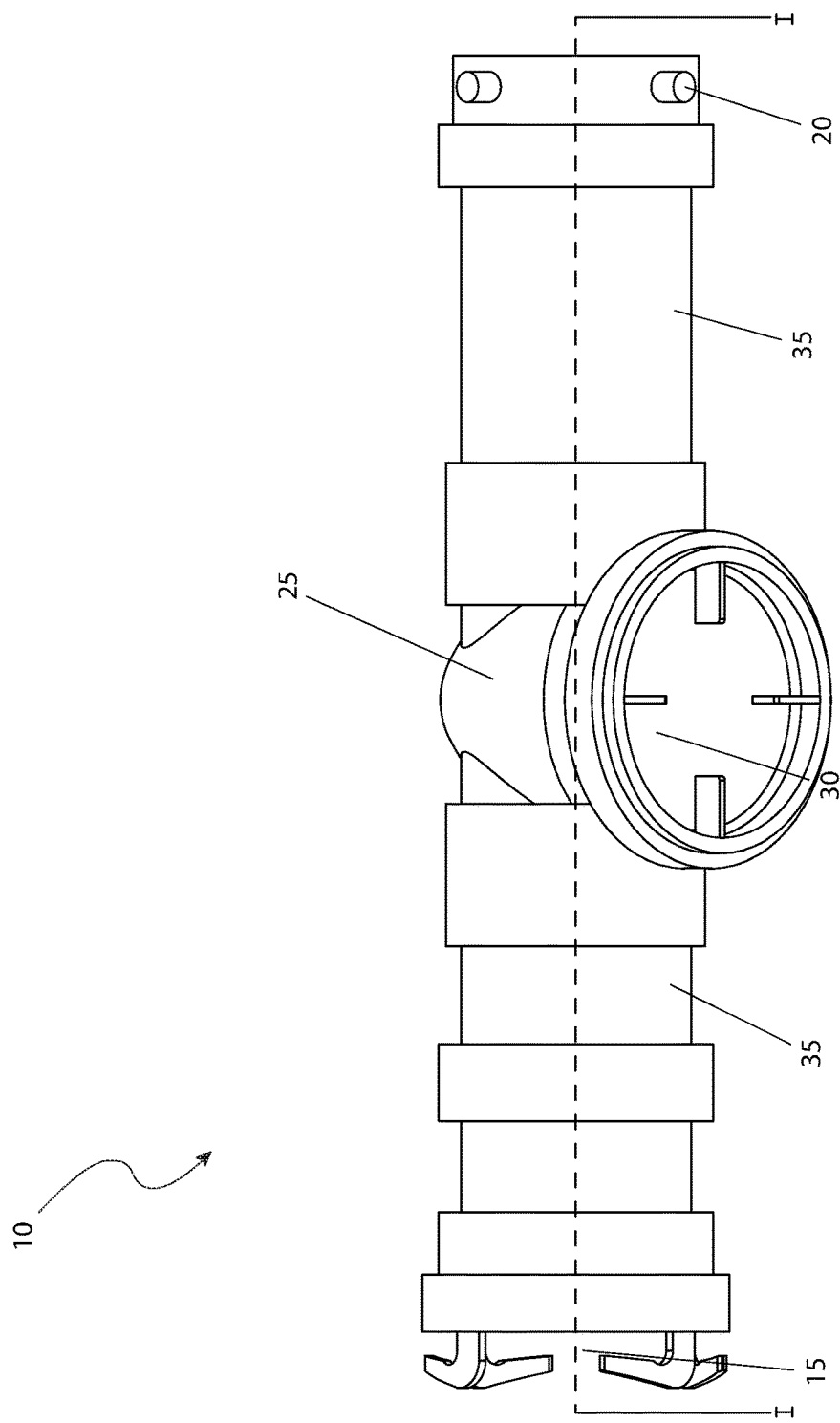
FIG. 1 is a top perspective view of the sewer backflow prevention device 10, according to the preferred embodiment of the present invention.

DESCRIPTIVE KEY 10 sewer backflow prevention device
15 bayonet fitting
20 lug fitting
25 backflow prevention valve
30 access cover
35 plastic piping
40 sewage travel path "s"
45 flapper gate
50 pivoting travel path
55 hinge assembly
60 lifted position
65 valve seat surface
70 recreational vehicle
75 flexible sewer hose
80 drain fitting
85 drain elbow
90 in-ground sewer connection
95 uphill recreational vehicle
100 hilly terrain
105 campground road
110 underground sewer line 115 blockage
120 sewer lateral

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a top perspective view of the sewer backflow prevention device 10, according to the preferred embodiment of the present invention is disclosed. The sewer backflow prevention device 10 (herein also described as the "device") 10, includes a bayonet fitting 15 on a first end and a lug fitting 20 on the opposite second end. This configuration allows for interconnection with hoses, couplings, elbows, flush fittings and other common fittings found as standard on recreational vehicle sewer connections. The overall length of the device 10 is approximately sixteen inches (16 in.), while the overall end height (connection diameter) is approximately three inches (3 in.). The center of the device 10 is provided with a backflow prevention valve 25 complete with an access cover 30. Further description of the backflow prevention valve 25 will be provided herein below. Two (2) sections of plastic piping 35 are utilized to connect the bayonet fitting 15 to the backflow prevention valve 25 and the backflow prevention valve 25 to the lug fitting 20. These connections are envisioned to be made by solvent adhesive, although other methods of interconnection such as male and female threads could also be utilized. As such the exact method of interconnection should not be interpreted as a limiting factor of the present invention.

Figure 2:
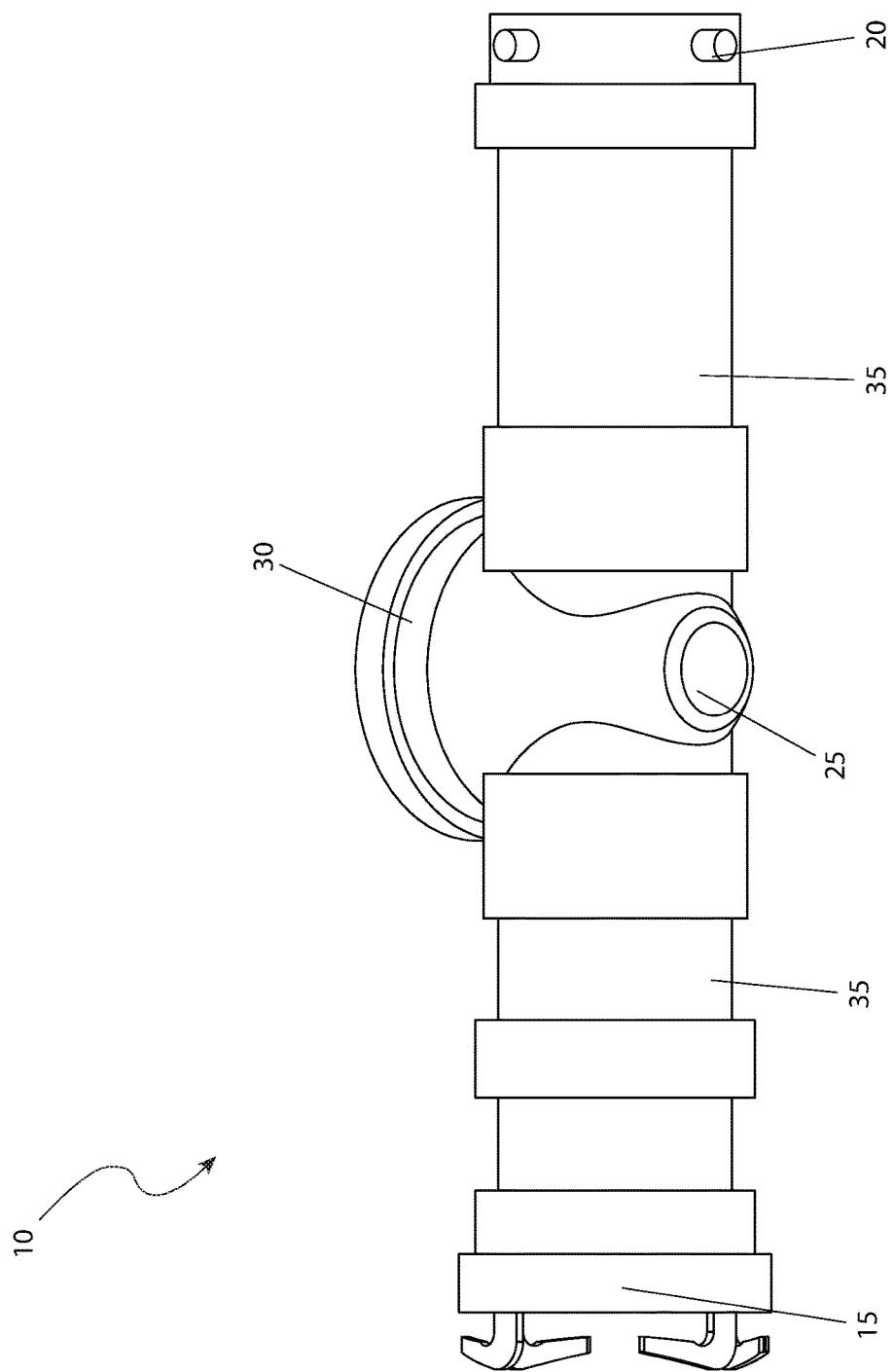
FIG. 2 is a side perspective view of the sewer backflow prevention device 10, according to the preferred embodiment of the present invention.

Referring next to FIG. 2, a side perspective view of the device 10, according to the preferred embodiment of the present invention is depicted. This view discloses the bayonet fitting 15, the lug fitting 20, the backflow prevention valve 25, the access cover 30, and the plastic piping 35. The access cover 30 is used to gain access to the interior of the backflow prevention valve 25 for purposes of cleaning, maintenance, or repair.

Figure 3:
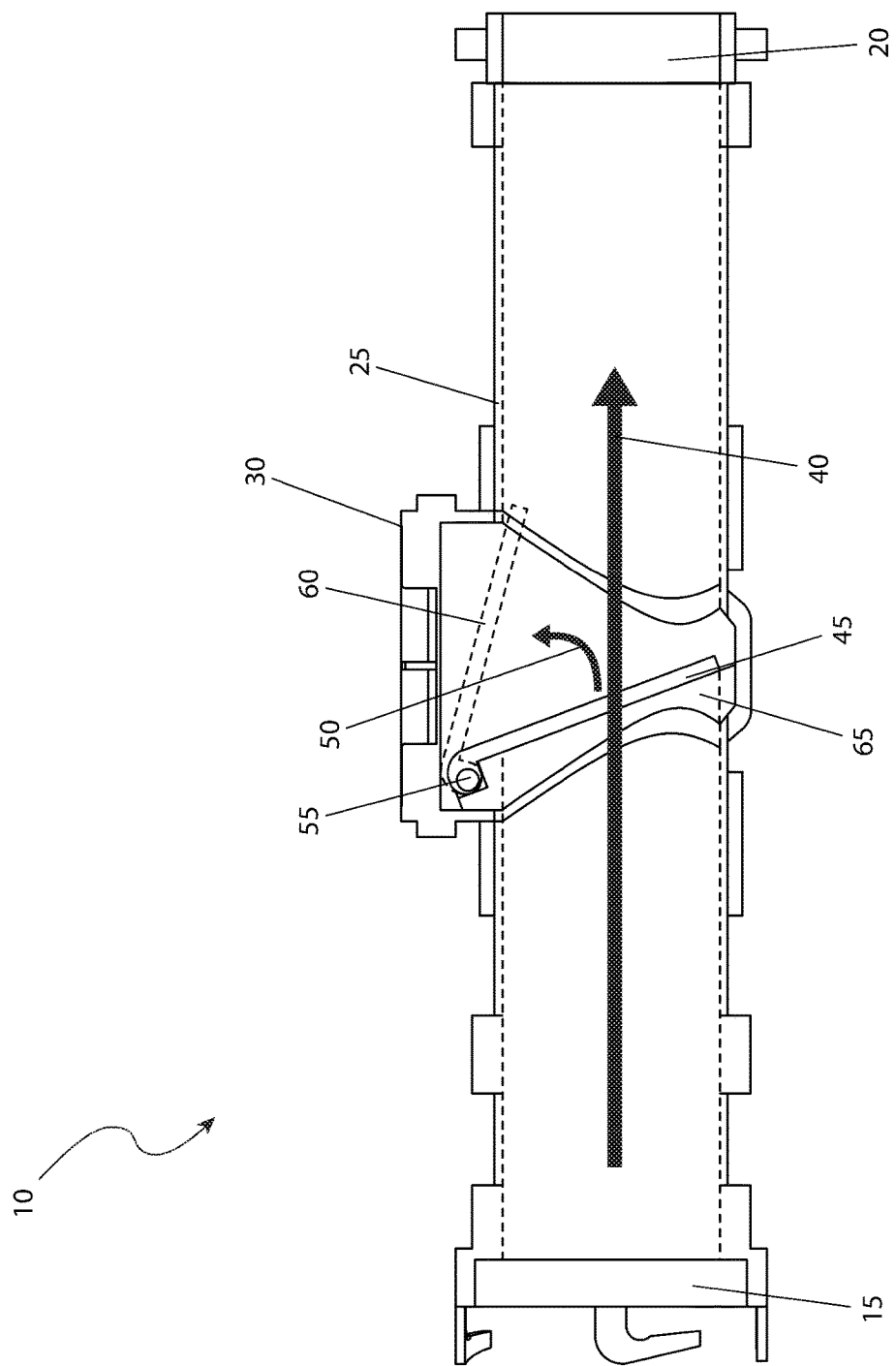
FIG. 3 is a sectional view of the sewer backflow prevention device 10, as seen along a line I-I, as shown in FIG. 1, according to the preferred embodiment of the present invention.

Referring now to FIG. 3, a sectional view of the device 10, as seen along a line I-I, as shown in FIG. 1, according to the preferred embodiment of the present invention is shown. Sewage travels through the device 10 along a sewage travel path "s" 40 as shown from the bayonet fitting 15 to the lug fitting 20. Under normal conditions, the sewage travel path "s" 40 will lift a flapper gate 45 through a pivoting travel path 50 via a hinge assembly 55 to a lifted position 60 (shown here via dashed lines for purposes of illustration). During times of no sewage flow, the flapper gate 45 rests against a valve seat surface 65. As the valve seat surface 65 prevents the flapper gate 45 from reverse travel, any sewage flowing in a direction opposite (one hundred eighty degrees (180°) in the opposing direction) will be stopped at the backflow prevention valve 25 and thus can travel through the device 10 in a reverse direction (from the lug fitting 20 to the bayonet fitting 15). As aforementioned described, the access cover 30 can be removed from the backflow prevention valve 25 to gain access to the flapper gate 45 and the valve seat surface 65 for purposes of cleaning, maintenance or replacement.

Figure 4:
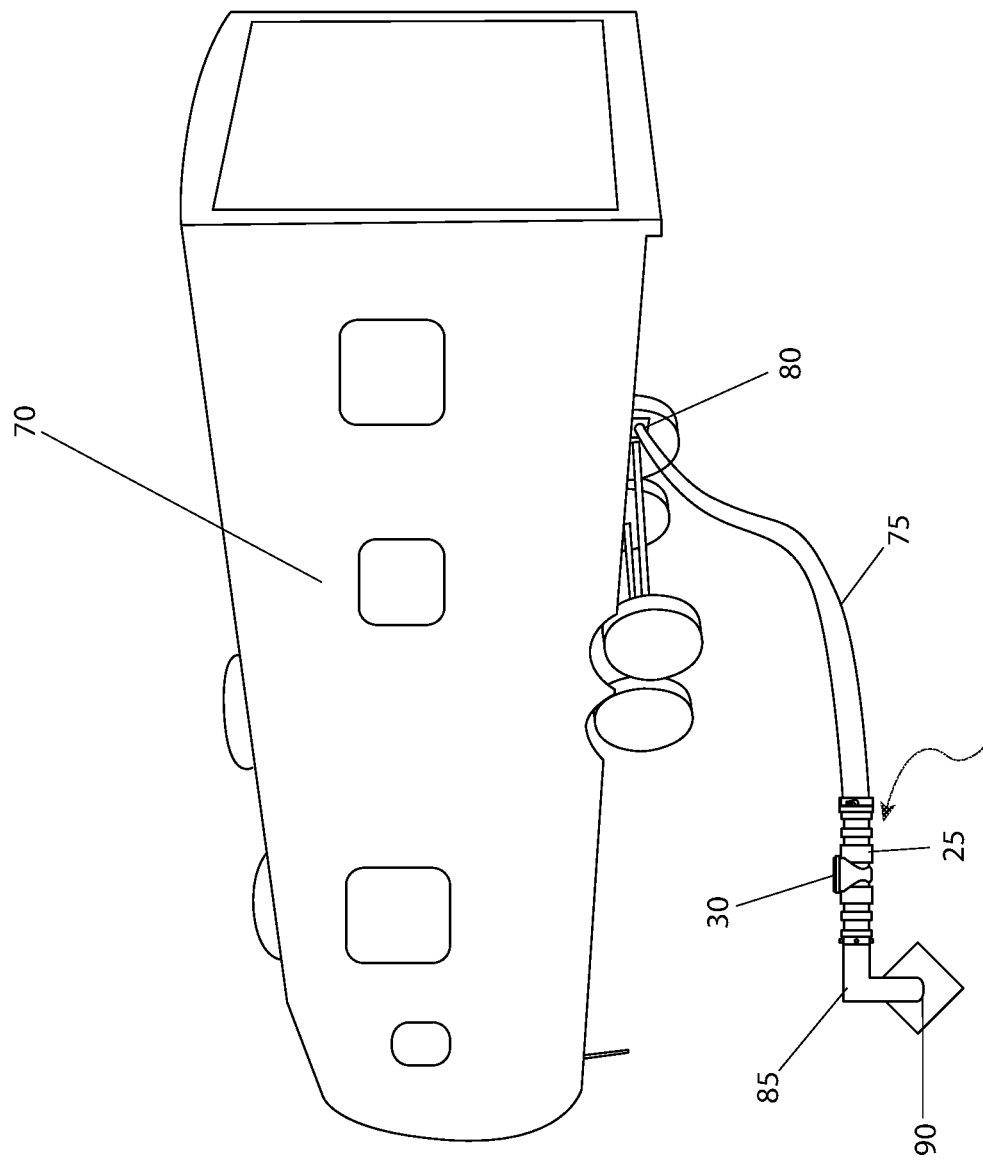
FIG. 4 is an illustrative view of the sewer backflow prevention device 10, shown in a utilized state according to the preferred embodiment of the present invention; and, FIG. 5 is another illustrative view of the sewer backflow prevention device 10, shown in a utilized state, according to the preferred embodiment of the present invention.

Referring next to FIG. 4, an illustrative view of the device 10, shown in a utilized state according to the preferred embodiment of the present invention is disclosed. This view discloses a recreational vehicle 70 with a flexible sewer hose 75 connected to a drain fitting 80. In this scenario, the device 10 is connected at the distal end of the flexible sewer hose 75. The opposite end of the device 10 is connected to a drain elbow 85 prior to connection to an in-ground sewer connection 90 either at a campground camping site or a dump station. The device 10 is located in a horizontal position with the hinge assembly 55 (as shown in FIG. 3) as well as the access cover 30 located at the center-top position. This position ensures proper operation of the device 10.

Figure 5:
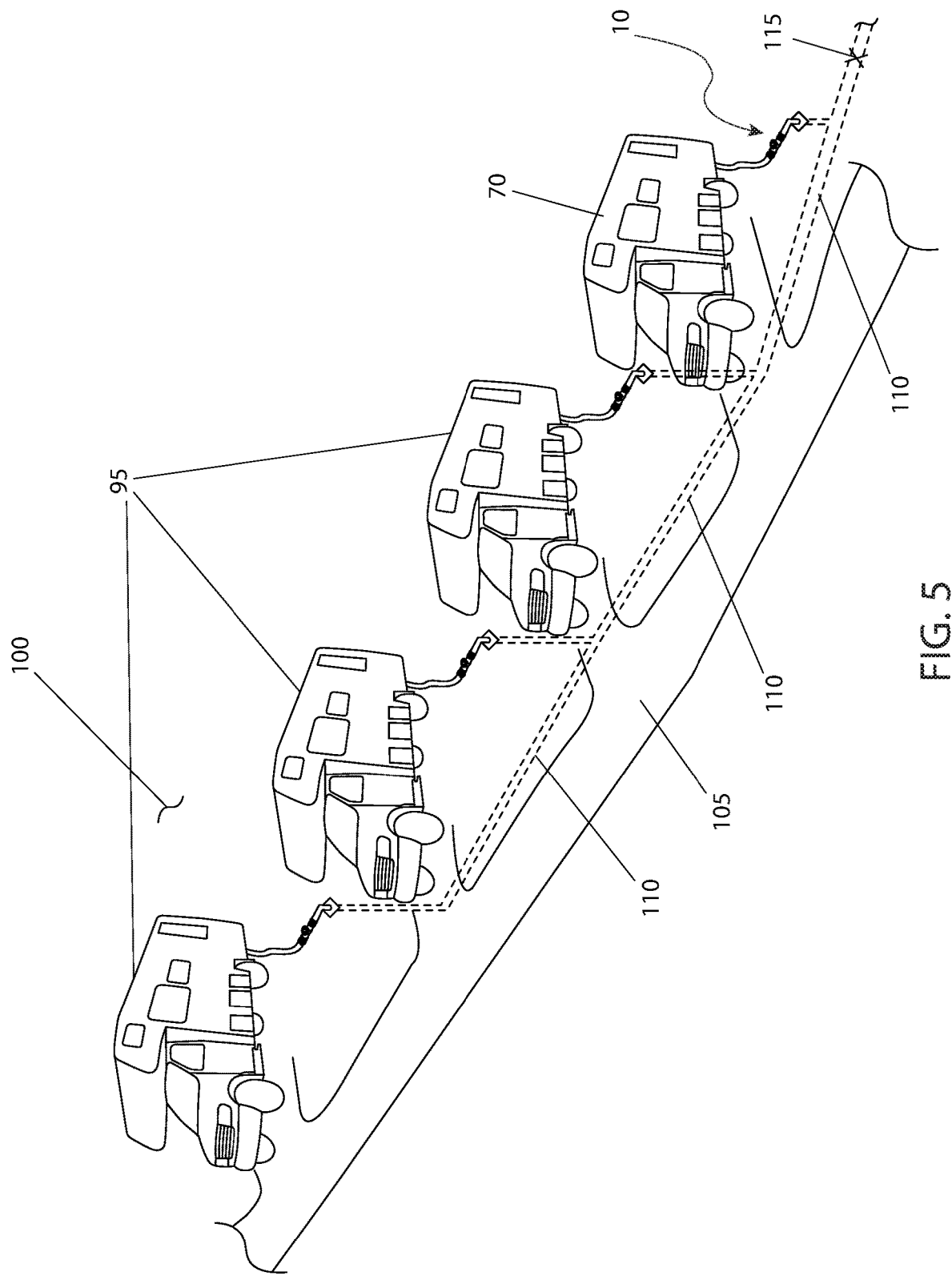

Referring finally to FIG. 5, another illustrative view of the device 10, shown in a utilized state, according to the preferred embodiment of the present invention is depicted. This view discloses multiple uphill recreational vehicles 95 located in hilly terrain 100 along a campground road 105. A recreational vehicle 70 equipped with the sewer backflow prevention device for recreational vehicles 10 is located downhill. All of the in-ground sewer connections 90 as well as the recreational vehicle 70 equipped with the device 10 are connected to an underground sewer line 110 which is also sloped downhill since such lines work by gravity flow. As one skilled in the art quickly realizes, a blockage 115 will cause sewage from the uphill recreational vehicles 95 to backup into the sewer lateral 120. However, upon reaching the device 10, further encroachment into the recreational vehicle 70 will be blocked.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 through conventional procurement channels including but not limited to recreational vehicle supply stores, discount stores, internet and mail order supply houses, and campground stores.

After procurement and prior to utilization, the device 10 would be prepared in the following manner: after the recreational vehicle 70 is parked, the user would hook the flexible sewer hose 75 to the drain fitting 80 in a conventional manner; the device 10 is then connected to the distal end of the flexible sewer hose 75; any drain elbow 85 or other needed connection would be applied to the exit of the device 10 prior to connection to the in-ground sewer connection 90. It would be ensured that the access cover 30 of the device 10 would be positioned at the top with respect to local grade. At this point in time the device 10 is ready for utilization.

During utilization of the device 10, the following procedure would be initiated: any sewage exiting from the recreational vehicle 70 would flow through the flexible sewer hose 75 and the device 10 in an unrestricted manner following the sewage travel path "s" 40 as shown in FIG. 3. Such operation is transparent to the user of the recreational vehicle 70 with respect to conventional operation. Should a backflow condition come to exist, such as caused by a blockage 115 located downstream, the flapper gate 45 will seat itself against the valve seat surface 65 preventing such flow. This action will keep sewage from other uphill recreational vehicles 95 from entering the equipped recreational vehicle 70.

After use of the device 10, it is simply removed and stored until needed again. Should the user wish to install mating caps on the bayonet fitting 15 and the lug fitting 20 of the device 10 to contain leakage and smells, they may do so. Additionally, the access cover 30 may be removed to gain access to the flapper gate 45, the hinge assembly 55 and the valve seat surface 65 for cleaning, maintenance, and repair when the device 10 is not in use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A sewer backflow prevention device, comprising:
   a bayonet fitting;
   a lug fitting;
   a pair of piping sections utilized to connect the bayonet fitting to a backflow prevention valve and the backflow prevention valve to the lug fitting; and
   wherein the backflow prevention valve having an access cover;
   wherein sewage travels along a sewage travel path from the bayonet fitting to the lug fitting;
   wherein the sewage travel path will lift a flapper gate through a pivoting travel path via a hinge assembly to a lifted position under normal conditions;
   wherein the flapper gate rests against a valve seat surface during times of no sewage flow;
   wherein as the valve seat surface prevents the flapper gate from reverse travel;
   wherein any sewage flowing in an opposite direction will be stopped at the backflow prevention; and
   wherein the valve may prevent sewage from traveling through the sewer backflow prevention device in a reverse direction.

2. The sewer backflow prevention device according to claim 1, wherein the connections are made by solvent adhesive.

3. The sewer backflow prevention device according to claim 1, wherein the connections are made by interconnection of male and female threads.

4. The sewer backflow prevention device according to claim 1, wherein the piping is made of plastic.

5. The sewer backflow prevention device according to claim 1, wherein the access cover is used to gain access to an interior of the backflow prevention valve for cleaning, maintenance, or repair.

6. The sewer backflow prevention device according to claim 1, wherein the sewer backflow prevention device allows for interconnection with a plurality of devices selected from the group consisting of a plurality of hoses, a plurality of couplings, a plurality of elbows, or a plurality of flush fittings that are standard on a recreational vehicle sewer connection.

7. The sewer backflow prevention device according to claim 1, wherein the sewer backflow prevention device is sixteen inches in overall length.

8. The sewer backflow prevention device according to claim 1, wherein the sewer backflow prevention device is three inches in overall end height.

9. The sewer backflow prevention device according to claim 1, wherein the sewer backflow prevention device is connected at a distal end of the flexible sewer hose.

10. The sewer backflow prevention device according to claim 1, wherein the opposite end of the sewer backflow prevention device is connected to a drain elbow prior to connection to an in-ground sewer connection.

11. The sewer backflow prevention device according to claim 1, wherein the opposite end of the sewer backflow prevention device is connected to a drain elbow prior to connection to an in-ground sewer connection at a dump station.

* * * * *